Figure 12:
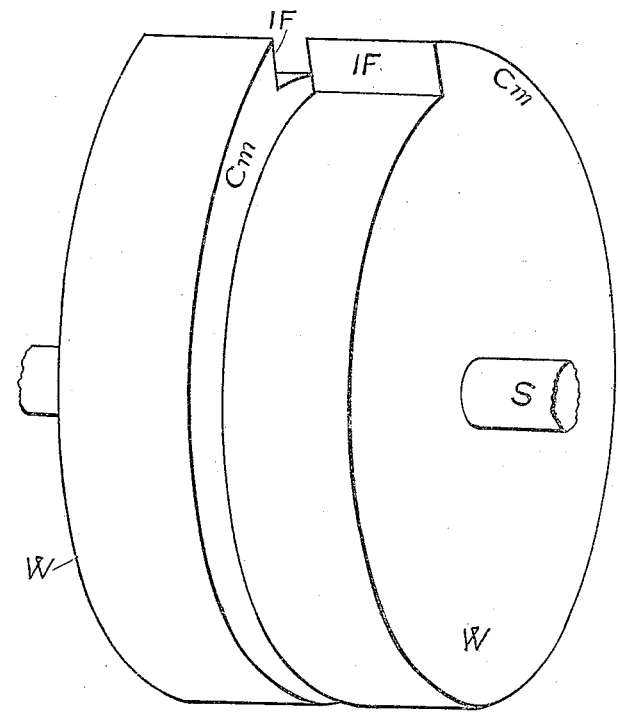

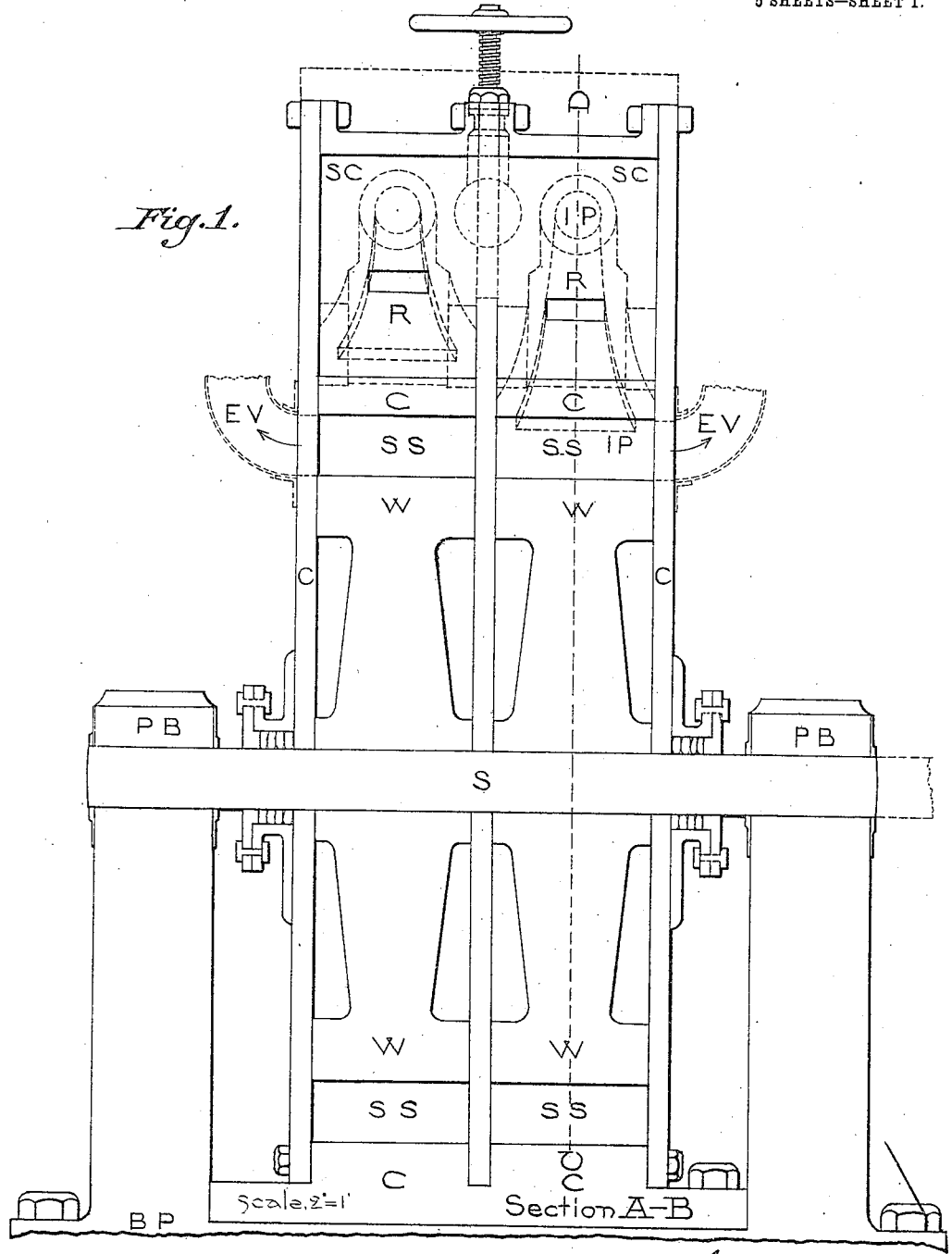

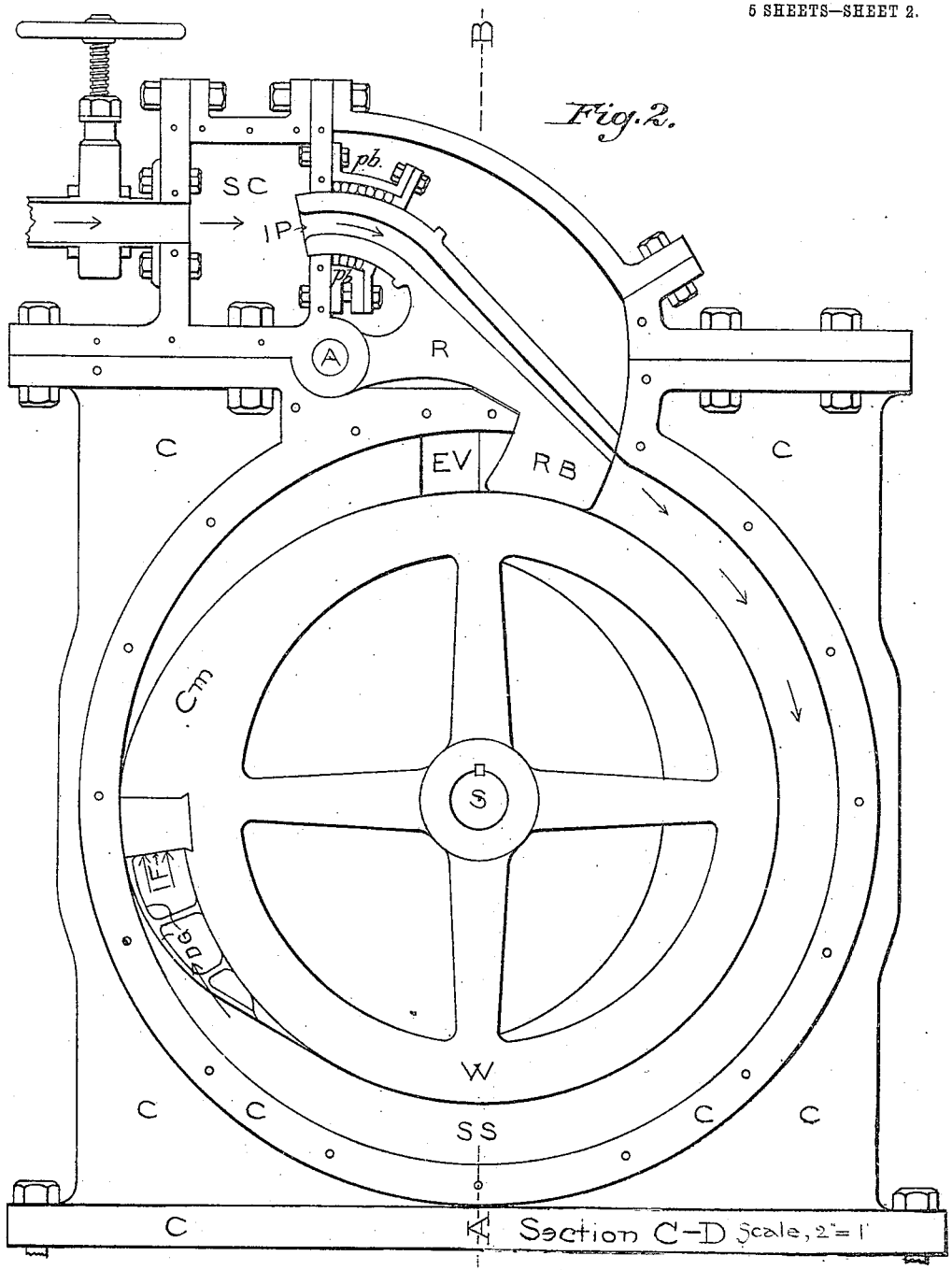

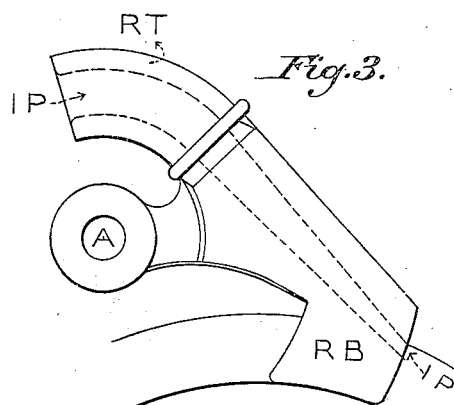
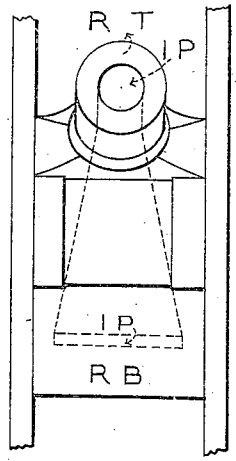
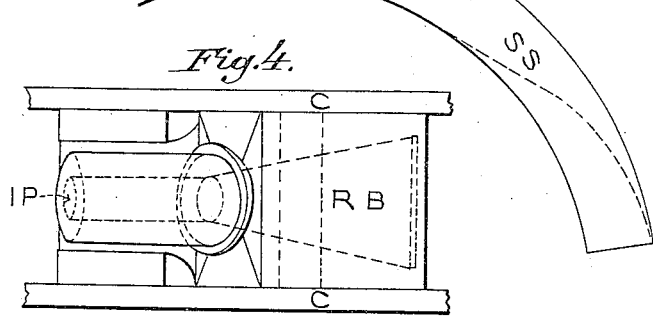
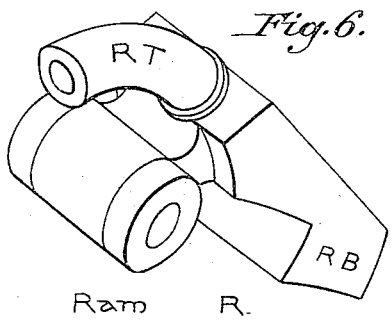
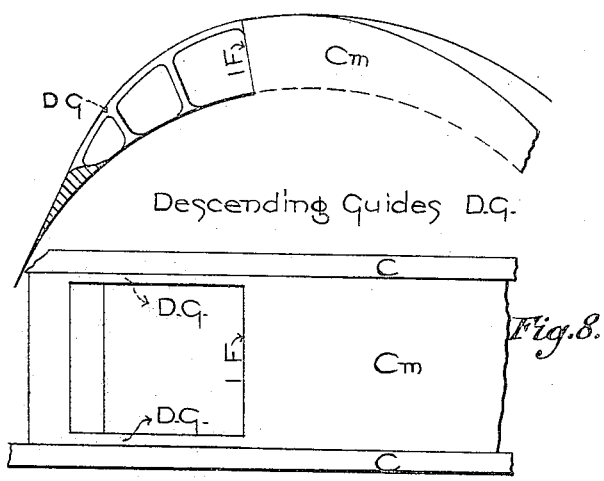

No. 817,679. PATENTED APR. 10, 1906.
G. C. STEALEY.
ROTARY ENGINE.
APPLICATION FILED MAR. 21, 1903.
5 SHEETS—SHEET 4.
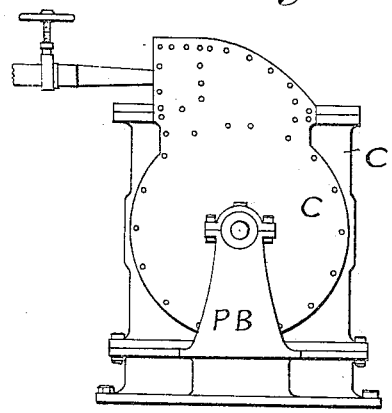
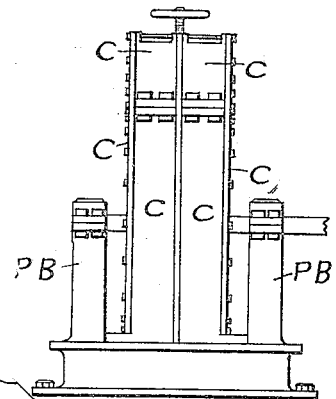
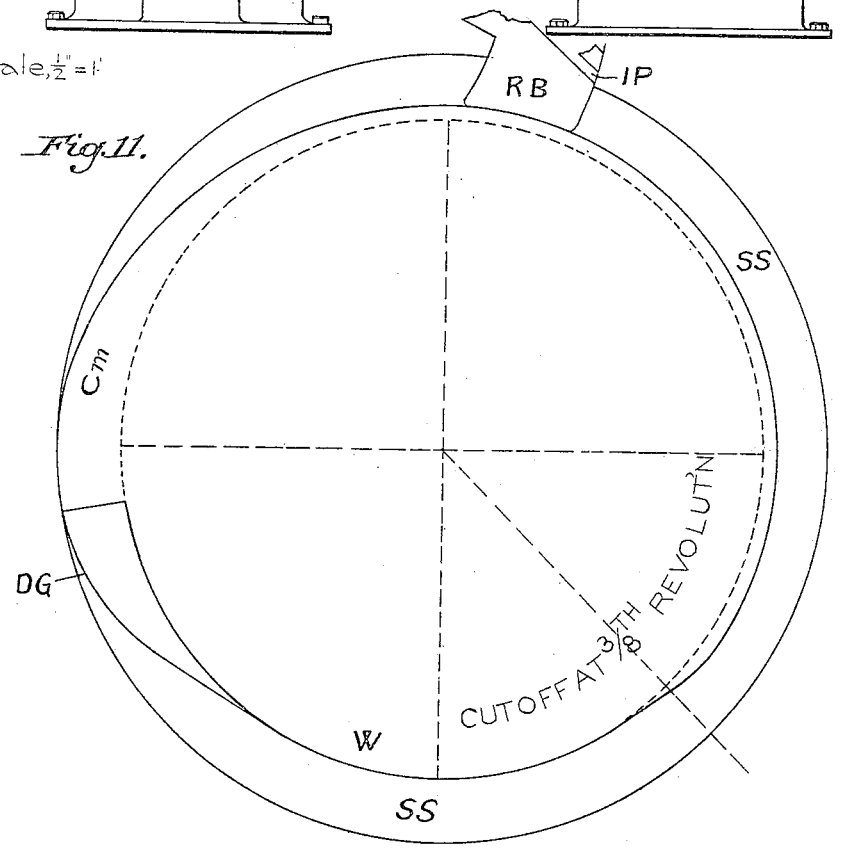
WITNESSES: John C. Ulrich, J. C. Davis.
INVENTOR. George Cluy Stealey
ATTORNEY.

No. 817,679. PATENTED APR. 10, 1906.
G. C. STEALEY.
ROTARY ENGINE.
APPLICATION FILED MAR. 21, 1903.

5 SHEETS—SHEET 5.

WITNESSES:

INVENTOR.
George Clay Stealey

ATTORNEY.

UNITED STATES PATENT OFFICE.

GEORGE CLAY STEALEY, OF DENVER, COLORADO.

ROTARY ENGINE.

No. 817,679.     Specification of Letters Patent.     Patented April 10, 1906.

Application filed March 21, 1903. Serial No. 148,962.

*To all whom it may concern:*

Be it known that I, GEORGE CLAY STEALEY, a citizen of the United States, residing at Denver, in the county of Arapahoe and State of Colorado, have invented certain new and useful Improvements in Rotary Engines; and I do declare the following to be a full, clear, and exact description of the invention, such as will enable others skilled in the art to which it appertains to make and use the same, reference being had to the accompanying drawings, and to the letters of reference marked thereon, which form a part of this specification.

This engine is designed to be worked by the force inherent in steam or any other gas. Throughout this specification and the claims for brevity the word "steam" will be used instead of the words "steam or gas," and it is here intended to mean either.

In the drawings, Figure 1 is a sectional view on the line A B of Fig. 2. Fig. 2 is a sectional view on the line C D of Fig. 1. Fig. 3 is a detail view of the ram and a portion of the steam-space. Fig. 4 is a plan of Fig. 3. Fig. 5 is an end view of Fig. 4. Fig. 6 is a perspective of the ram. Fig. 7 is a detail of a portion of the cam and descending guides. Fig. 8 is a plan of Fig. 7. Fig. 9 is a side view of the engine; Fig. 10, an end view of the same; and Fig. 11 is a diagrammatic view showing the outline of the wheel and its peripheral cam for a cut-off at three-eighths of a revolution, the ram-block, and inlet-port and steam-space; and Fig. 12 shows arrangement of wheels for reversing.

The object of my invention is to use the force of impact of the current and expansion of the body of steam by receiving the said forces on the plane surface of a projection fixed on the periphery of a wheel constituting a piston, which wheel is inclosed in a steam-tight case C, as shown on accompanying drawings. Said projection is here named the "impact-face" and lettered IF and may be the end of the cam hereinafter mentioned or a steel block set into the same, and back of the same at each side are the descending guides DG. This object is attained by interposing a block once at each revolution of the wheel, which prevents the steam from moving or escaping in a backward direction or in a direction reverse from that of the current of the steam at the inlet-port. The said block interposed is here named the "ram-block" and lettered RB, and the said inlet is here named the "inlet-port" and lettered IP. The said ram-block is moved and actuated and is of a piece with the mass of metal through which the inlet-port is made, (shown at IP,) through which the steam passes in moving from the boiler or steam-chest to the steam-space SS. Said mass of metal is here named the "ram" and lettered on the drawings herewith R. The ram includes and consists of the axis A, the ram-tube RT, and the ram-block RB, all in one piece, and has the passage named the "inlet-port" IP passing through it, as shown on drawings herewith. The said ram terminates on its upper end or the end entering the steam-chest in the aforementioned tube RT, which moves in and out through a packing-box $pb$, designed to prevent the escape of steam or gas at the contact or joint of its outer surface with the orifice in the wall of the steam-chest through which it passes. Said tube is designed to be made of such a thickness that its cross-section will form a concentric disk of sufficient area to when being pressed upon by the steam within the said chest take sufficient force from the said pressure to move the tube outward from the chest, moving with the tube the mass of said ram about its axis A, so that the ram-block RB will press close against the plane and smooth surface of the circumference of the wheel W with such close contact that being properly packed no steam can escape backward. The amount of this pressure is evidently possible of regulation by the proportioning of the thickness of the said ram-tube RT or the area of the concentric disk of its cross-section and the length of the radius of the circular curve of said tube to the length of the radius of the interposing block RB, (considered as lever-arms around the axis A,) respectively. The pressure should be sufficient to prevent the escape of steam, but not sufficient to act as a brake on the wheel.

The reaction of the steam after entering the steam-space SS against the surface of the ram-block RB has no tendency to raise it from or press it against the surface of the wheel, as the lines of pressure are normal to the circular curve of the block's surface, and therefore pass through the axis A. Hence the axis A takes all the reactionary pressure, and the impact-face receives all the working pressure, as it is the only surface exposed to the pressure of the steam that can move.

The steam entering the steam-chest will act as a constant spring to press outward the ram-tube and downward the ram-block upon the wheel, and this action as a spring is recognized and taken advantage of and claimed as a part of this invention, and it is here claimed as an especial and economical feature of this engine that it receives without waste and converts into power the force of impact of the moving body of the steam mechanically, as is hereinafter described. It is proper here to state that this power is so considerable that it gives to this engine a peculiar value and that after this force of impact is utilized the steam before escaping exerts its force of expansion against the impact-face for any length of stroke (percentage of revolution) predetermined. As an example, to make this value clear, a boiler evaporating fifteen tons of steam or water in six hours—
steam at a velocity of one thousand five hundred feet per second—head due to this velocity—thirty-four thousand feet—(34,000 feet by 15 tons)—four hundred and ten thousand feet tons in six hours—two million two hundred and eighty thousand feet pounds per minute—seventy horse-power, which this engine would utilize and a cylinder-engine would waste.

It is designed and intended that when the wheel is at that part of its revolution at which the ram-block RB pressure upon any part of its periphery which is a true circle, in contradistinction to that part which is a spiral, the throat of the steam-port shall be open to the full flow of the steam, which may then, passing always in one forward direction, being guided by the curve of the periphery of the wheel and its case, come with, as nearly as friction and condensation will permit, its full initial force both of impact and expansion against the said impact-face, turning the wheel always in one direction with the full lever-arm unvarying, and as the wheel is fixed to the shaft turning the said shaft without further expenditure of power for gearing or any reverse motion or dead-points of stroke in one continuous series of revolutions.

It is designed and intended that when the wheel has completed three-fourths or any other fractional part of its revolution the designer of any particular wheel may predetermine the spiral projection here named the "cam" and lettered C on drawings herewith shall by sliding under the ram-block RB raise it till the throat of the inlet-port becomes completely closed by passing upward till it is covered by the surface of the casing. The steam then in the steam-space SS acts by expansion till the impact-face moves so far forward that the outlet or exhaust-vent EV becomes exposed and opens again and all back steam or gas escapes. Said vent is always open except at the passage of the block of the cam on which is the impact-face, leaving nothing behind the impact-face to resist the turning of the wheel but the pressure of the outside air at any time, making condensation unnecessary. This feature is claimed as a valuable characteristic of this engine and invention.

This engine is intended for both speed and economy at once or for speed only or for economy only, the results being obtained by varying the cut-off and the size of the inlet-port. A large inlet-port and a long period of admission of steam before cutting off—say three-fourths of the revolution of the wheel—will result in the highest speed, (five thousand or more revolutions per minute,) depending on the diameter of the wheel, being theoretically attainable, while a short period of admission of steam—say one-tenth of the revolution of the wheel—aided by a small inlet-port, will result in the greatest economy. This last cut-off can be obtained by increasing the radius of the periphery of the wheel by an amount equal to the depth of the inlet-port all around the circumference except, say, one-tenth of it immediately following the impact-face. This feature of the cut-off is also here claimed as an invention.

It is recognized that there is a dead-point to this wheel when the cam raises the ram-block to its highest point. Were the engine resting at this point, it could not be started by steam. To obviate this difficulty, two similar wheels are put side by side on the same shaft, the impact-face of the one wheel being placed at the diametrically opposite point of its circumference when fixed on the shaft to that on the other wheel. The wheels can be placed on a shaft that is either vertical or horizontal. Also for motor or traction engines or propeller-shafts, where it is necessary to reverse when going at high speeds, a wheel arranged on the same shaft to revolve in the opposite direction will effect the reverse completely.

To recapitulate the valuable qualities of this engine: First, the maximum pressure of impact and expansion are exerted tangent to the periphery of the wheel against the lever-arm of the full radius of the wheel throughout its entire revolution; second, continuous motion in one direction; third, possibility of high speed, governed only by the velocity of steam and the applied load; fourth, the obviation of the necessity for condensation, the vent being always open; fifth, the obviation of connecting-rods, dead-points, gearing.

Novel features of the invention are: the steam-jet arranged tangent to the circumference of the wheel, striking the impact-face and getting the benefit of the full lever-arm of the radius throughout a revolution; the ram, consisting of the ram-tube which is acted on by the steam as a spring, and the ram-block, which interposes its mass to receive the reactionary thrust of the steam, and the inlet port which is inclosed and governed by the ram; the open vent; the cam and impact-face.

Among the uses for which this invention is intended are the following: to turn the propeller-shaft of a ship; to turn the drive-wheels of a locomotive; to turn the drive-wheels of a motor, carriage, or cycle; to turn a dynamo on the same shaft; to turn any stationary shaft, horizontal or vertical, great or little speed or power.

Having described my invention and set forth its merits, what I claim is—

1. In an engine, the combination with a piston-cylinder, and a rotary piston therein having an impact-face, of a swinging member having a curved portion and formed with a port for the admission of a pressure agent into the cylinder to act on the impact-face of the piston, and a pressure-agent chest into which the curved portion of said member extends, whereby it may be acted on by the pressure agent for moving said member into engagement with the piston, substantially as described.

2. In an engine, the combination with a rotary piston having an impact-face, and its cylinder, of a movable inlet-port for admission of steam into the cylinder, a block movable with the inlet-port and adapted to be interposed periodically in the cylinder to prevent backward movement of the steam, and means for exerting an elastic pressure on the inlet-port concentrically to the piston to move the inlet-port and block into position, substantially as described.

3. In an engine, the combination with a rotary piston having an impact-face, and its cylinder, of a swinging member having an inlet-port for admission of steam into the cylinder and provided with a block to be periodically interposed in the cylinder to prevent backward movement of the steam, and a chamber for an elastic fluid to exert an elastic pressure upon said member concentrically to the piston for moving the inlet-port and block into position, substantially as described.

4. In an engine, the combination with a rotary piston having an impact-face and a peripheral cam, and its cylinder, of a swinging member formed with an inlet-port for the admission of steam into the cylinder and provided with a block adapted to rest upon the periphery of the piston and prevent backward movement of the steam, said member having a curved extension at one end through which the inlet-port extends, and a steam-chest into which the curved extension of a swinging member projects and with which the inlet-port communicates and in which chest the steam will exert an elastic pressure on the tubular extension of the swinging member for moving the inlet-port and block into position, substantially as described.

In testimony whereof I affix my signature in presence of two witnesses.

GEORGE CLAY STEALEY.

Witnesses:
F. K. BARBER,
J. W. LOWER.